United States Patent Office 2,843,597
Patented July 15, 1958

2,843,597
INTERMEDIATE AND PROCESS FOR PRODUCING 5-TETRADECYLBENZIMIDAZOLONE

Robert L. Clark, Woodbridge, and Arsenio A. Pessolano, Colonia, N. J., assignors to Merck & Co., Inc., Rahway, N. J., a corporation of New Jersey No Drawing. Application July 31, 1956
Serial No. 601,115

2 Claims. (Cl. 260—309.2)

This invention relates to the preparation of a new chemical compound 5-tetradecylbenzimidazolone. It is also concerned with the preparation of a novel chemical compound 5-myristoylbenzimidazolone produced as an intermediate in the synthesis of 5-tetradecylbenzimidazolone.

This new chemical compound, 5-tetradecylbenzimidazoline, possesses marked and effective anticonvulsant properties and is non-toxic. One of the disadvantages encountered in the clinical use of some of the barbiturates presently administered in the treatment of convulsions such as epilepsy has been the occurrence of side effects of which hypnosis has been one of the most serious. The 5-tetradecylbenzimidazolone compares favorably with the presently used anticonvulsant compositions insofar as their ability to protect against convulsions. In addition, 5-tetradecylbenzimidazolone possesses the distinct advantage of being free of the strong hypnotic effect associated with barbiturates.

In preparing these novel chemical compounds, we utilize as the starting materials benzimidazolone, which has the structural formula:

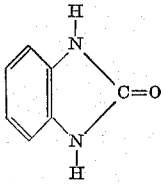

and myristoyl chloride which may be identified by the following formula:

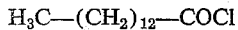

$H_3C$—$(CH_2)_{12}$—COCl

It has been found that these two compounds, namely benzimidazolone and myristoyl chloride, may be caused to react in the presence of carbon disulfide and aluminum chloride to yield 5-myristoylbenzimidazolone, a compound having the following structural formula:

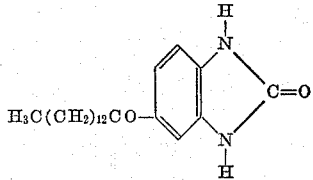

The 5-myristoylbenzimidazolone thus obtained is hydrogenated to form 5-tetradecylbenzimidazolone, which may be identified by the following formula:

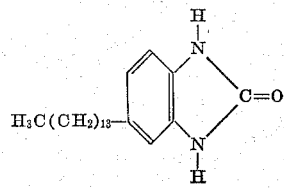

The 5 - tetradecylbenzimidazolone possessing pronounced anticonvulsant properties is effective orally and therefore administered in the form of capsules or tablets. The capsules would contain about 0.25 gram to about 0.50 gram of pure 5-tetradecylbenzimidazolone. The tablets would contain approximately 0.25 gram to about 0.50 gram of pure 5-tetradecylbenzimidazolone, a small amount of a lubricant such as magnesium stearate and a disintegrating agent such as cornstarch.

The following examples are given by way of illustration and not of limitation.

EXAMPLE 1

5-myristoylbenzimidazolone

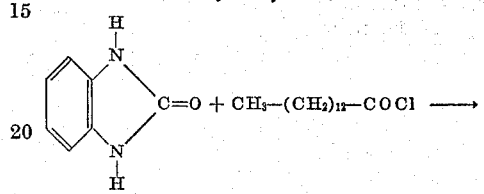

To a rapidly stirred mixture of 100 grams (0.405 mole) of myristoyl chloride, and 53.6 grams (0.40 mole) of benzimidazolone in 200 milliliters of carbon disulfide was added 117 grams of aluminum chloride in portions. During the addition the reaction was cooled occasionally with an ice bath. After stirring at room temperature for one hour it was heated to reflux for two hours, then allowed to stand for fourteen hours at room temperature. The viscous solution was poured onto ice with stirring, and a light tan solid separated. The carbon disulfide was evaporated and the product collected. It weighed 130 grams and melted at about 200° C. It was recrystallized from 800 milliliters of hot acetic acid to give 111 grams of 5-myristoylbenzimidazolone. It softens at 200° and melts slowly to 229° C.

*Analysis.*—Calculated for: $C_{21}H_{32}N_2O_2$: C, 73.21; H, 9.37; N, 8.13. Found: C, 73.49; H, 9.28; N, 8.39.

5-tetradecylbenzimidazolone

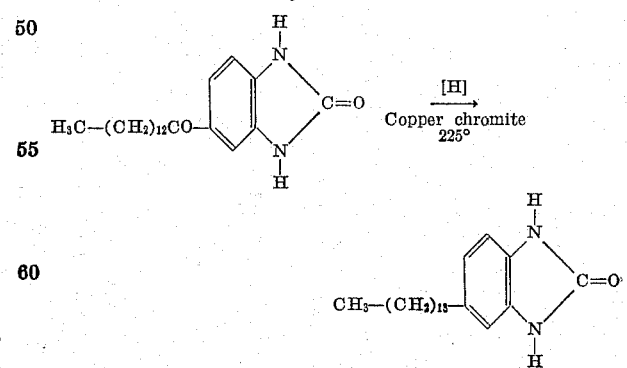

One hundred grams of 5-myristoylbenzimidazolone in 1500 milliliters of absolute ethyl alcohol was hydrogenated at 225° C. for three and a half hours using 10 grams of copper chromite #8 as the catalyst. The product was insoluble and was filtered off together with the catalyst. It was extracted from the catalyst with three 300 milliliter portions of boiling dioxane. When these combined extracts were cooled, 65 grams of product separated. This was recrystallized from 500 milliliters of hot acetic acid to give 54 grams of 5-tetradecylbenzimidazolone, melting at 226° C.

*Analysis.*—Calculated for: $C_{21}H_{34}N_2O$: C, 76.31; H, 10.37; N, 8.48. Found: C, 76.49; H, 10.10; N, 8.61.

EXAMPLE 2

A tablet containing 5-tetradecylbenzimidazolone may be prepared as follows:

|  | Grams |
|---|---|
| 5-tetradecylbenzimidazolone | 0.25 |
| Magnesium stearate | 0.005 |
| Cornstarch | 0.145 |

The above-mentioned ingredients are thoroughly mixed and pressed into tablets.

Any departure from the above description which conforms to the present invention is intended to be included within the scope of the claims.

We claim:

1. 5-myristoylbenzimidazolone represented by the following structure:

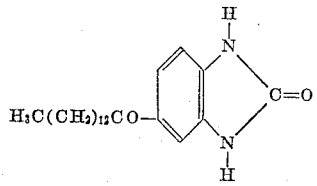

2. The process which comprises reacting benzimidazolone with myristoyl chloride in the presence of carbon disulfide and aluminum chloride to form myristoyl benzimidazolone and reacting the latter compound with hydrogen at an elevated temperature in the presence of copper chromite to form 5-tetradecylbenzimidazolone.

References Cited in the file of this patent

Efros et al., Chem. Abstracts, vol. 48, col. 13686 (1954).